US010502006B2

(12) United States Patent
Maw

(10) Patent No.: US 10,502,006 B2
(45) Date of Patent: Dec. 10, 2019

(54) ROTARY IMPACT TOOL

(71) Applicant: Ulterra Drilling Technologies, L.P., Fort Worth, TX (US)

(72) Inventor: Jason Maw, Beaumont (CA)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 118 days.

(21) Appl. No.: 15/268,617

(22) Filed: Sep. 18, 2016

(65) Prior Publication Data

US 2017/0081929 A1 Mar. 23, 2017

Related U.S. Application Data

(60) Provisional application No. 62/220,839, filed on Sep. 18, 2015.

(51) Int. Cl.
*E21B 17/06* (2006.01)
*F16D 43/20* (2006.01)

(52) U.S. Cl.
CPC .............. *E21B 17/06* (2013.01); *F16D 43/20* (2013.01)

(58) Field of Classification Search
CPC ........ E21B 17/03; E21B 17/04; E21B 17/046; E21B 17/06; E21B 17/07; E21B 17/073; E21B 17/076; F16D 43/20; F16D 43/21; F16D 43/213
See application file for complete search history.

(56) References Cited

U.S. PATENT DOCUMENTS

| 1,845,074 A | | 2/1932 | Billstrom | |
|---|---|---|---|---|
| 2,307,275 A | * | 1/1943 | Johnson | E21B 17/06 285/330 |
| 2,612,974 A | * | 10/1952 | Krause | A01F 29/16 192/150 |
| 3,365,038 A | * | 1/1968 | Dison | B64D 35/00 192/48.5 |
| 3,585,818 A | * | 6/1971 | Helble | F16D 43/21 173/105 |
| 8,307,914 B2 | | 11/2012 | Pafitis et al. | |
| 2002/0185312 A1 | | 12/2002 | Armell et al. | |
| 2011/0198126 A1 | | 8/2011 | Swietlik et al. | |

OTHER PUBLICATIONS

Nick Moore, "Slow Motion—How an Impact Wrench Works", https://www.youtube.com/watch?v=f0gSJa3L_7c , Dec. 4, 2012 (last accessed Sep. 18, 2016).

* cited by examiner

*Primary Examiner* — Robert E Fuller
*Assistant Examiner* — Lamia Quaim
(74) *Attorney, Agent, or Firm* — Kilpatrick Townsend & Stockton LLP

(57) ABSTRACT

A rotary impact tool assembled in a drill string transfers torque and axial force between two components. The rotary impact tool includes an anvil and a hammer axially aligned with engaging faces. At a threshold torque, the hammer disengages from the anvil and rotates freely until a biasing element displaces the hammer to reengage the anvil. Kinetic energy stored in the hammer is transferred to the anvil when the faces of the hammer and anvil reengage. This provides an impact to the anvil and any attached component. The tool can accommodate misalignment of the attached components.

8 Claims, 5 Drawing Sheets

ROTARY IMPACT TOOL

RELATED APPLICATION

This application claims the benefit of U.S. Provisional Application No. 62/220,839, filed Sep. 18, 2015, entitled, "Rotary impact Tool," which is incorporated herein in its entirety by reference for all purposes.

FIELD OF THE INVENTION

This invention relates generally to downhole tools and more particularly to rotational impact tools used in downhole drill strings.

BACKGROUND OF THE INVENTION

Drilling for natural resources such as petroleum and natural gas can include advancing a borehole for many miles to reach underground deposits. In a drilling operation, a drill bit is mounted to the end of a drill string. The drill string is rotated from the top of the string or by a motor at the bottom of the string, or both, to rotate the drill hit and advance the borehole. FIG. 1 is a schematic representation of a drilling operation 2. In conventional drilling operations a drill bit 8 is mounted on the end of a drill string 6 comprising drill pipe and drill collars. The drill string may be several miles long and the bit is rotated to advance the borehole by failing strata ahead of the bit. A pump circulates drilling fluid through the drill pipe and out of the drill bit flushing rock cuttings from the bit and transporting them back up the wellbore. The drill string 6 comprises sections of pipe that are threaded together at their ends to create a pipe of sufficient length to reach the bottom of the wellbore. Tools 10 such as motors and measurement while drilling (MWD) equipment can be incorporated in the drill string as well.

Positive displacement or mud motors (PDM) can be included in the drill string to convert the pressure of drilling fluid pumped down the drill string to rotational motion. The rotational motion or torque can be used for various purposes including creating transverse vibration in the drill string or rotating the drill bit. A mechanical link connects the mud motor to the bit. The mechanical link can be a universal joint that converts eccentric rotation of the mud motor output to axial rotation.

Variations in the pressure of the drilling fluid that drives the mud motor can create surges in the output torque of the mud motor and unstable rotation of the rotor in the housing causing damage to the rotor and/or stator. Where the mud motor is linked to a drill bit, variations in drag on the bit in the borehole can result in stick-slip rotation which can generate high torque or surging torque that can damage the mud motor and the link. This can result in unscheduled servicing of the drill string and significant expense.

A downhole tool that limits the torque in a mechanical link between connected tools to limit damage would be advantageous.

SUMMARY OF THE INVENTION

The present invention is directed to a rotary impact tool to be used in a downhole drill string. Excess torque applied to components of a drill string can cause components to fail during operation requiring cycling of the drill string out of the hole and incurring additional expense. The present tool transmits torque between drill string components such as a mud motor and drill bit and provides protection from excessive torque generated in the drill string. Where torque builds to excessive levels, the tool disengages and rotates at a slower speed, relieving stress. This can prevent damage to drill string components such as mud motors. The tool provides an impulse when over-torqued that can disengage frozen or stuck components during the drilling operation. The tool can also compensate for misalignment of tools in the drill string and convert eccentric motion to axial rotation. The tool requires less axial space in the drill string than previous universal joints.

In one embodiment, the tool includes first and second portions that move between engaged and disengaged positions. Where torque between the bit and the tool exceeds a threshold value, the first portion of the tool moves axially from engaging the second portion to a position disengaged and spaced from the second portion of the tool. In the engaged position torque is transmitted through the tool. In the disengaged position first and second portions are spaced apart and torque is no longer transmitted to the bit. In some embodiments, the first portion disengages from the second portion and the first portion rotates in response to the applied torque. A biasing component urges the first portion to reengage the second portion. The kinetic energy in the rotation of the first portion is imparted to the second portion as they reengage. This can generate a rotational impact or torque impulse transmitted to the bit.

In another aspect of the invention, a tool for downhole applications includes a hammer that engages an anvil for transmitting torque about an axis. A resilient component maintains engagement of the hammer and anvil up to a threshold torque. The hammer and/or anvil is movable axially against the force of the resilient component disengaging in response to the torque transmitted by the tool to axially disengage the hammer from the anvil.

In another aspect of the invention, a rotating link between a motor and a bit for advancing a borehole includes a pair of engaging faces. The faces are held in engagement by a resilient component to transmit torque. A helical mating assembly permits the faces to move to axially spaced positions in response to a predetermined applied torque.

In another aspect of the invention, a first face is rotated by a torque generating tool in a downhole drill string. An axial biasing component bears on the rotating face to mechanically engage the first face to a second axially aligned face. Engagement of the faces transmits kinetic energy of the first rotating face to the second face as an impulse.

In another aspect of the invention, a method of limiting torque in a drill string includes engaging a hammer and an anvil along an axis and applying torque about the axis to rotate the hammer and the anvil. In response to a threshold torque level, an axial force separates the hammer from the anvil. The method can also include rotating the hammer to a speed greater than the rotation of the anvil and releasing the axial force on the hammer. The hammer reengages the anvil. Rotational energy of the hammer is transferred to the anvil as the hammer speed is reduced to the rotational speed of the anvil.

In another aspect of the invention, a rotating hammer is driven by a motor. At low torque the hammer engages an anvil attached to a bit for advancing a borehole and transfers torque from the motor to the bit along an axis of the drill string. In response to a threshold torque the hammer disengages axially from the anvil. The hammer rotational speed increases. The hammer axially reengages the anvil transferring kinetic energy to the bit as an impulse.

In another aspect of the invention the hammer and anvil each includes axially extending engaging faces spaced from the rotational axis. In another aspect of the invention the rotational impulse tool is used in conjunction with a positive displacement motor and/or a fluid driven impulse tool. In another aspect of the invention, the tool provides for misalignment of the motor shaft and the bit. In another aspect of the invention the biasing means is a spring. In another aspect of the invention the tool transfers axial force between components of the drill string.

DETAILED DESCRIPTION OF THE PREFERRED EMBODIMENTS

Figure 1:
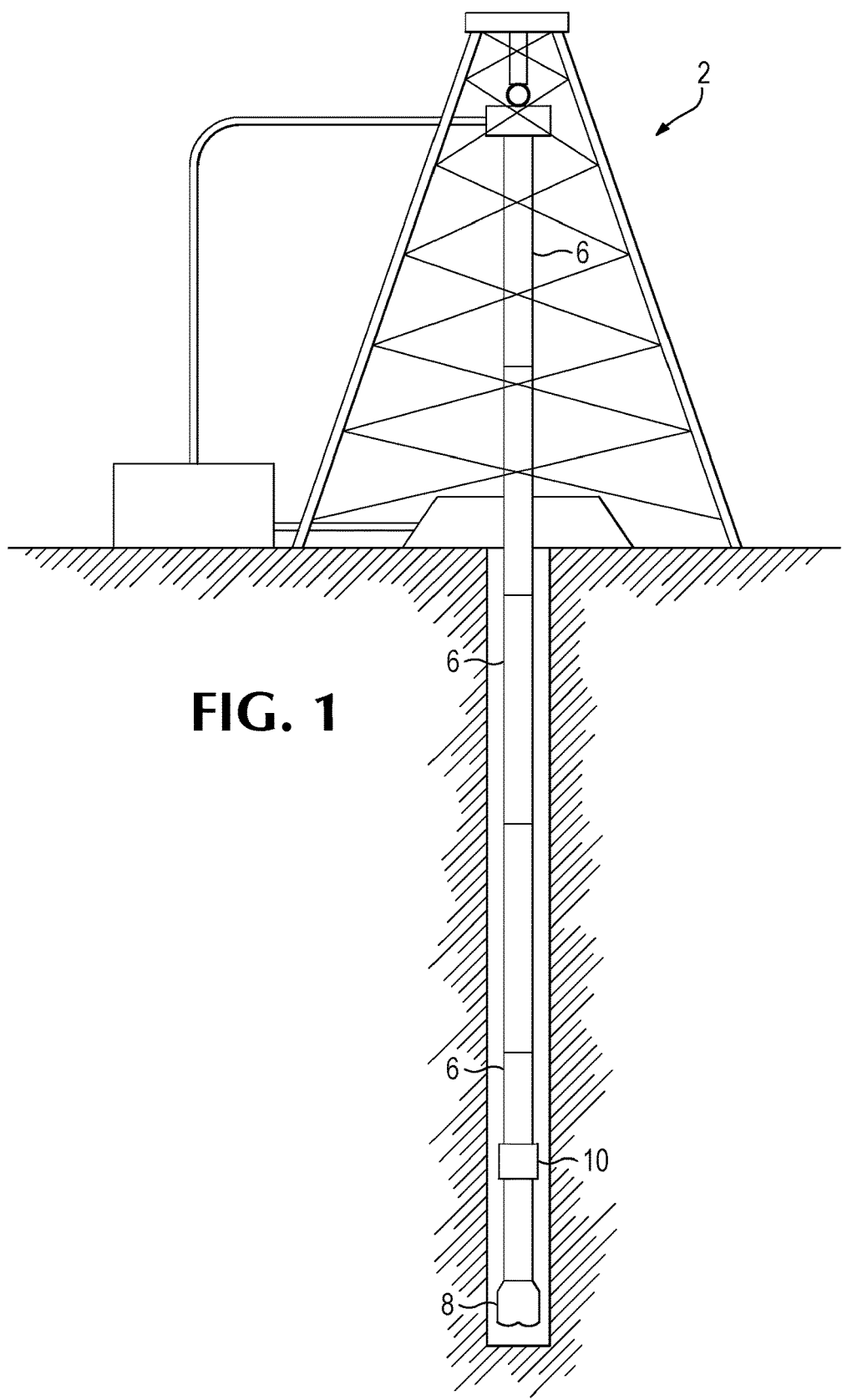
FIG. 1 is a schematic diagram of a drilling operation.
Figure 2:
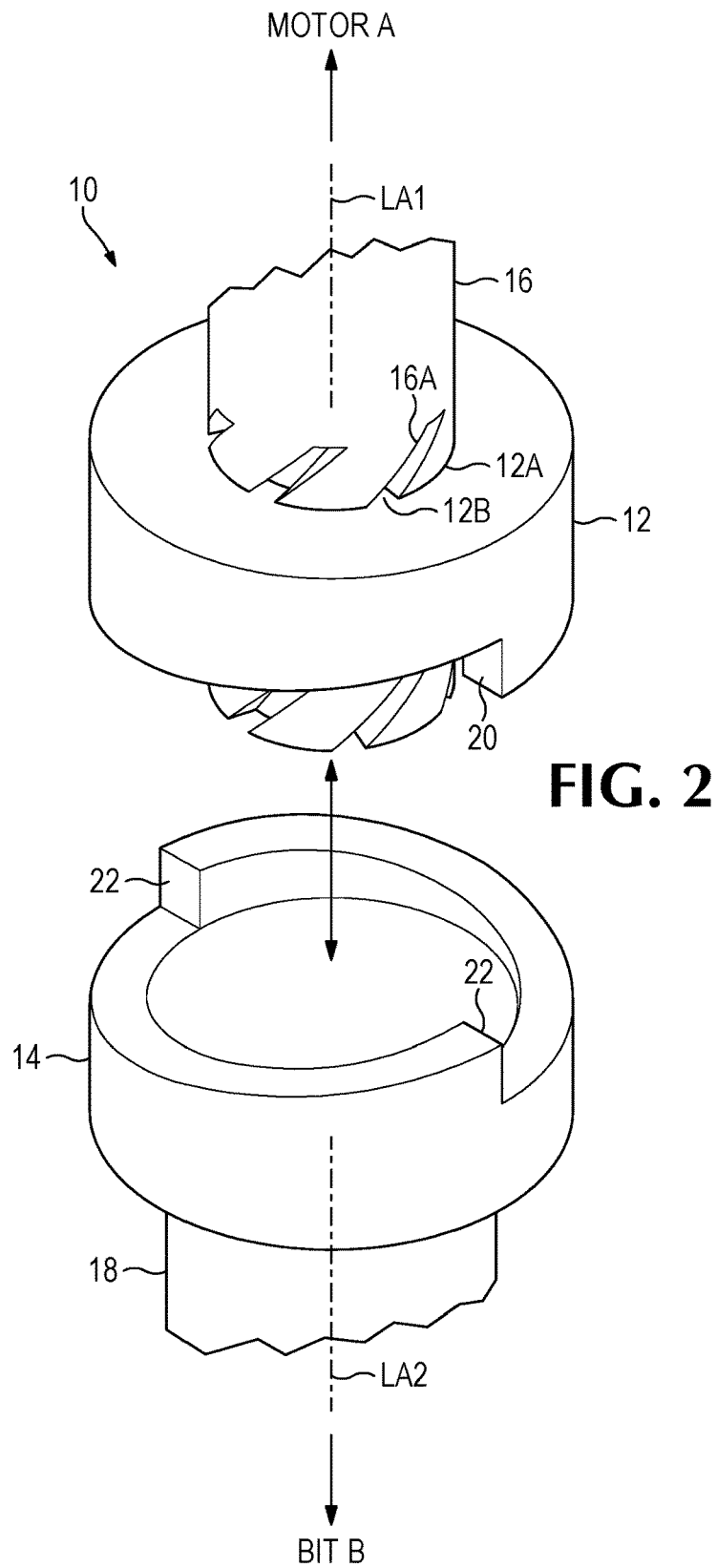
FIG. 2 is an exploded perspective view of a portion of the inventive rotary impact tool.

A drill string in its basic form consists of sections of threaded pipe assembled end to end with a drill bit at a distal end for advancing a borehole. The drill string can be miles long and rotated at a proximal end of the pipe by a drilling rig to turn the drill bit and advance the borehole. There are many different tools and components that can be assembled in the drill string to perform a range of functions such as reaming out obstructions from the bore bole, widening the borehole and vibrating the string to reduce drag of the drill string.

Positive displacement motors or mud motors can be installed near the drill bit to drive the drill bit instead of, or in addition to, driving the drill string from the above ground drill rig. Fluid is pumped down the drill string during operation under pressure to flush material out of the borehole. A mud motor uses the pressure of the fluid to rotate a drive shaft. The output of the motor is eccentric, with the output shaft rotating about a circle as well as rotating about its axis. In order to limit the stress on the drill string and bit, a universal joint typically is used to convert the eccentric rotational component in the drill string motion to axial rotation.

In one embodiment, a rotary impact tool can be used as, or in addition to, the universal joint. The tool can be used with other components of the drill string to limit transmitted torque with a minimum number of moving parts. The tool can transmit significant torque as well as rotational impact or impulse and can accommodate misalignment of transmitting and receiving rotating elements.

One embodiment of the rotary impact tool is generally shown in FIGS. 2-6. The disclosed rotary impact tool 10 includes a hammer 12 connected to a first shaft, which in this embodiment is a driving shaft 16 with helical splines or grooves 16A, and an anvil 14 connected to a second shaft, which in this embodiment is a driven shaft 18. The hammer and driving shaft have a common longitudinal axis LA1. The anvil and driven shaft have a common axis LA2. The hammer 12 is connected to the shaft 16 by a thread structure 12B in hole 12A that engages the helical grooves or splines 16A. In the illustrated embodiment, shaft 16 includes grooves 16A and hammer 12 includes splines 12B. This arrangement, though, could be reversed. When the complementary splines and grooves are coupled together, the hammer rotates with the driving shaft. The hammer also moves axially on the driving shaft with the threads of the hammer engaging the threads of the shaft to translate axially along the shaft.

The hammer can include one or more hammer faces 20 spaced from the rotational axis that extend generally axially and engage a corresponding one or more anvil face 22 that preferably extends generally axially. The faces can optionally extend at an angle to the longitudinal axis or have non-planar shapes. Anvil 14 can be an integral part of driven shaft 18 or can be fixed to the shaft mechanically. The anvil could alternative be fixed to the driving shaft and the hammer to the driven shaft.

Figure 3:
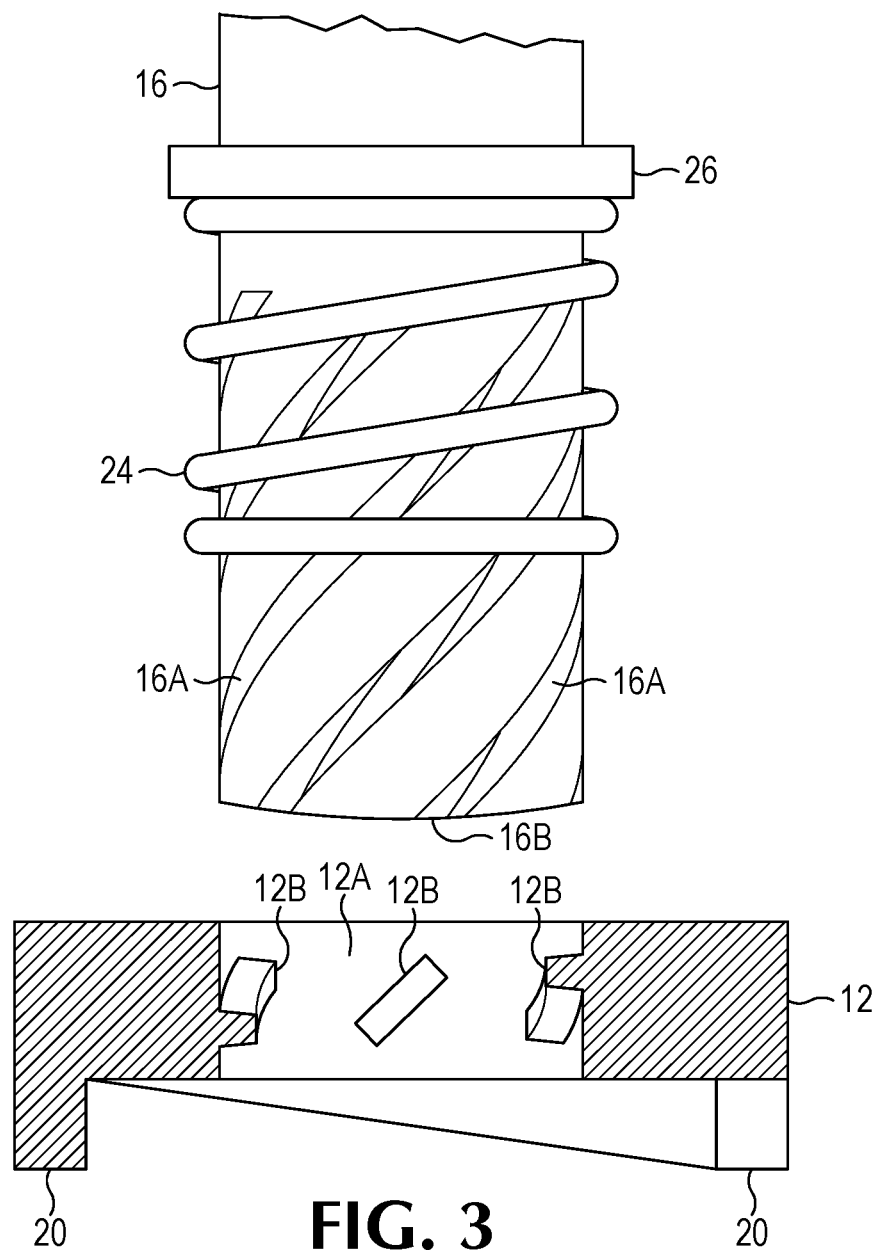
FIG. 3 is an exploded side sectional view of a portion of the inventive rotary impact tool.
Figure 5:
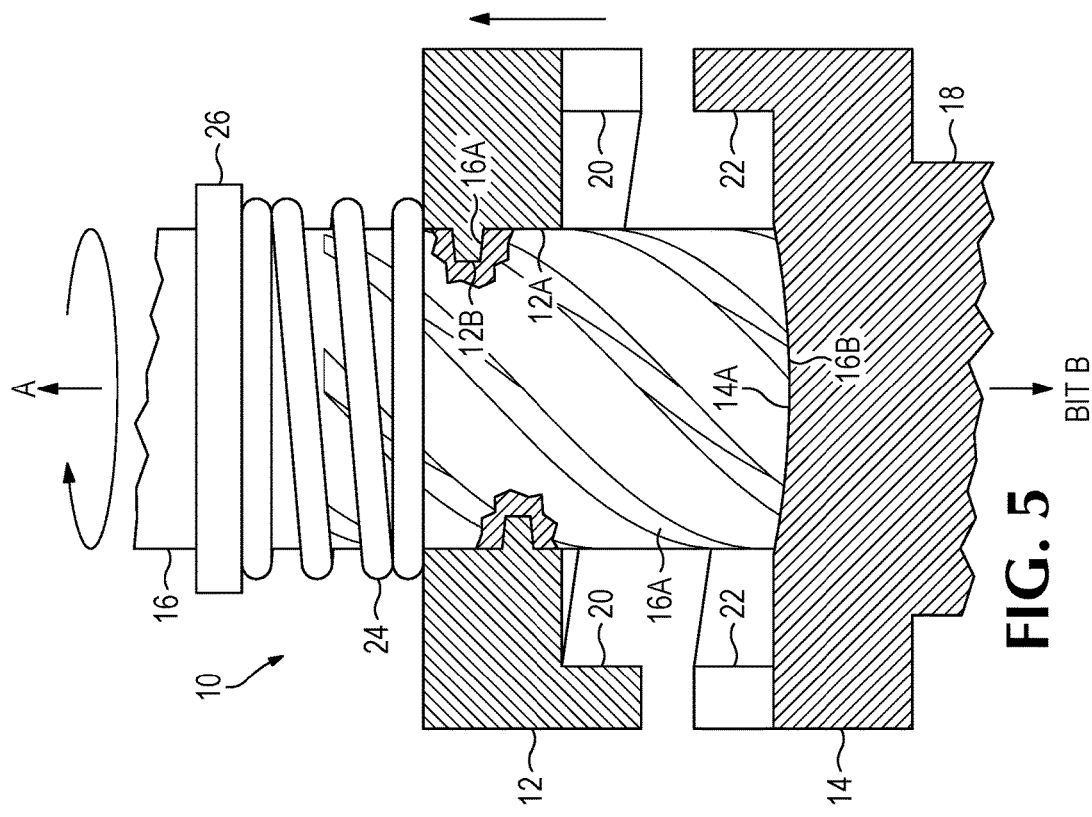
FIG. 5 is a partial cross section of the rotary impact tool in the disengaged position.

FIG. 3 shows a portion of the tool 10 with the hammer. In this embodiment, driving shaft 16 has helical slots or grooves 16A to engage the hammer. Hole 12A of the hammer has protruding helical thread portions (i.e., the splines) that engage the slots of the shaft. A resilient component 24 shown as a coil spring bears on a collar 26 of the shaft and on hammer 12. With the threads of the hammer engaging the threads of the shaft, rotation of the hammer on the shaft moves the hammer axially on the shaft compressing the spring 24 when a predetermined torque value is reached.

Resilient component 24 is shown as a coil spring for the purpose of illustration. The resilient component can be a wave spring, a gas spring or any other kind of spring. The resilient component could utilize drilling fluid flow or fluid pressure as a biasing means applied to the hammer. The resilient component can apply torque to the hammer to bias rotation of the hammer rather than biasing axial movement.

Figure 4:
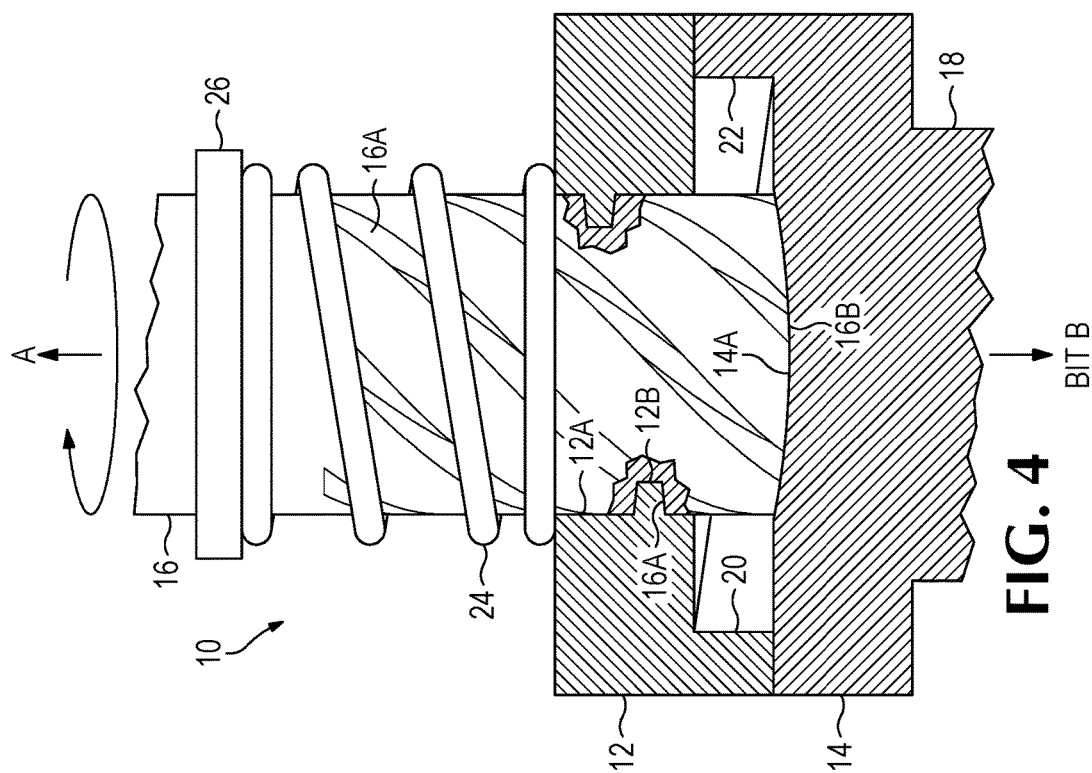
FIG. 4 is a partial cross section of the rotary impact tool in the engaged position.

FIG. 4 shows the tool 10 in cross section in the engaged position with the hammer engaged with the anvil. Spring 24 bearing on the collar 26 and the hammer biases the hammer towards the anvil. Faces 20 and 22 are engaged so that torque applied to shaft 16 is transferred to shaft 18. The two shafts in the engaged position spin at the same speed.

Where the bit is free to rotate, torque in the tool 10 is low. As the bit engages the borehole, drag slows the bit rotation and torque increases in the tool between the motor and bit. The torque can increase further when the bit sticks in the borehole and the motor continues to develop torque. The biasing means and spline configuration define a threshold torque value.

When the threshold torque value is met, rotation of the shaft in the hammer displaces the hammer axially and compresses spring 24. Below the threshold value axial movement of the hammer is limited by the spring. As the torque increases to the threshold level, the upward force of the hammer overcomes the bias of the spring. The hammer moves upward along the grooves of the shaft to the disengaged position shown in FIG. 5. In the disengaged position, the faces 20 and 22 of the hammer and anvil are separated. The hammer disengaged from the anvil spins freely in response to the increased torque and increases in speed storing energy. The spring 24 pushes the hammer back down rotating the hammer on the helix threads.

As the hammer face 20 meets the anvil face 22, hammer rotation slows to equal the rotation of the anvil. The kinetic energy of the rotating hammer is transferred to the anvil and any component connected to the anvil. Torque again builds in the tool and either the anvil spins with the hammer, or torque again builds to a threshold level where the hammer disengages from the anvil to spin and impact the anvil again. The hammering action is only provided in over-torque conditions. Reducing torque can protect components of the drill string from operating outside recommended conditions, extending service life. The hammering action can mitigate stick-slip conditions at the bit. The hammer can incorporate additional mass to increase the kinetic energy stored when the hammer disengages the anvil.

The tool can accommodate misalignment of the driving shaft and the driven shaft. The driving shaft can rotate in relation to the driven shaft about the axis of the driven shaft and about a point near mating faces of the hammer and anvil. Rotation can be measured as the angular deflection "β" of the longitudinal axis LA1 of the driving shaft in relation to the longitudinal axis LA2 of the driven shaft. The driving shaft can also move about axis LA1 making an angular deflection or orbit "Φ" about the axis LA2. In a typical application where the joint 10 connects an eccentric rotation to an axial rotation, the angle β can be constant and the angle Φ sweeps zero to 360 degrees. More complex angular movement and rotation are possible as well. The tool can also transmit axial force. The end of the shaft and the top of the anvil can include corresponding hearing surfaces 16B and 14A. The hearing surfaces can provide for relative rotation of the shafts and transfer of axial force through the tool and misalignment of the driving shaft and driven shaft.

Misalignment of the components can result in the faces 20 and 22 not meeting with normal parallel alignment. This can generate axial forces between the hammer and anvil which can modify the threshold torque value that disengages the hammer and anvil. The faces can be inclined or otherwise configured to compensate for the misalignment.

Alternatively, the shaft and hammer opening 12A can have different configurations that perform similar functions. For example, the shaft can have helical ridges that engages a helical slot or groove of the hammer hole. The helical features could employ a pin in a helical slot. The pitch of the corresponding features can vary along their length and may extend around only a portion of the shaft circumference and/or hole circumference. The driven shaft can be connected to the hammer and the driving shaft can be connected to the anvil. The helical features are sized and configured to accommodate the threshold torque and impulse forces.

The rotary impact tool in operation can be an assembly inside the drill string so that there is an outer casing of the drill string with components inside such as the mud motor and rotary impact tool.

Figure 6:
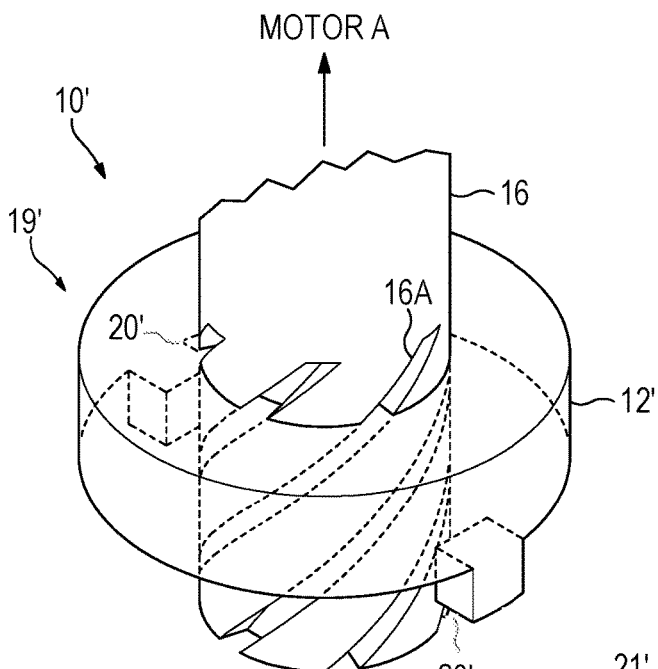
FIG. 6 is perspective view of an alternative embodiment of a hammer and anvil.
Figure 7:
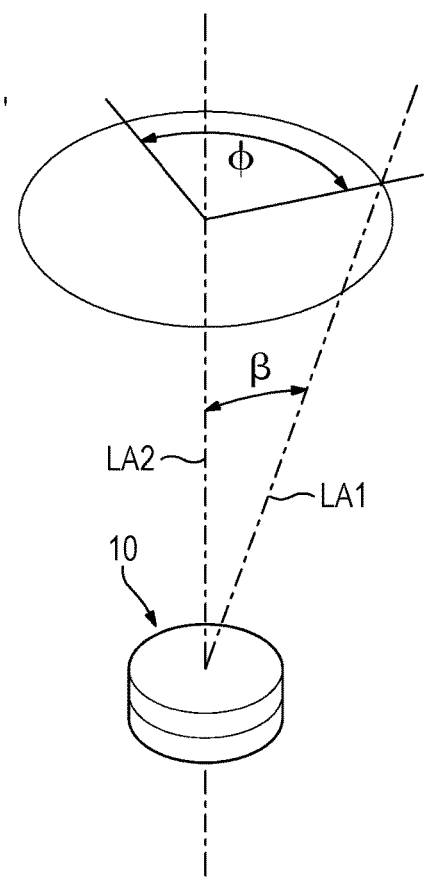
FIG. 7 is a schematic illustrating misalignment of components.

FIG. 6 shows an alternative embodiment 10' of the hammer and anvil of a rotary impact tool 10'. Here the hammer 12' has teeth 19' extending axially from the hammer with faces 20'. The anvil is the distal portion of the driven shaft (or a member secured to the driven shaft) with teeth 21' extending radially with faces 22' at the end of the shaft or bar. In an engaged position, the hammer is adjacent the anvil and the faces 20' engage faces 22'. As described above, when torque exceeds a set value, the hammer moves axially away from the anvil to a disengaged position separating the faces. The hammer then rotates to the engagement position and the faces meet.

The tool limits excessive torque in the drill string, disengaging to rotate connected components at a slower speed. Excessive torque can cause the timid motor to operate outside of its design specification and can result in separation of rotor or stator material which then blocks fluid flow through the hit. Limiting torque can protect components from damage. In limiting over-torque the tool also provides an impulse down-string that can disengage a bit stuck in the borehole. The tool compensates for misalignment of tools in the drill string acting as a universal joint to convert eccentric motion to axial rotation. When used as a universal joint, the tool is smaller than previous universal joints requiring less axial space in the drill string.

The examples shown are for the purpose of illustration. Any combination of disclosed features for a downhole tool that engage misaligned shafts or that axially separates components to limit torque transmission will fall within the scope of this disclosure.

It should be appreciated that although selected embodiments of the representative rotary impact tools are disclosed herein, numerous variations of these embodiments may be envisioned by one of ordinary skill that do not deviate from the scope of the present disclosure. The disclosure set forth herein encompasses multiple distinct inventions with independent utility. The various features of the invention described above can be included in each rotary impact tool. Nevertheless, the features can be used individually in a joint to obtain some benefits of the invention. While each of these inventions has been disclosed in one exemplary form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed.

What is claimed is:

1. Apparatus for using in a downhole drill string transmitting torque between drill string components providing protection from excessive torque generated in the drill string, comprising:
   an anvil coupled to a driven shaft, and the anvil comprising at least one at least one anvil face that extends axially;
   a hammer coupled to a driving shaft with a helical mating assembly, the hammer comprising at least one hammer face that extends axially and being coupled with the driving shaft with helical coupling to allow for rotation and axial translation of the hammer on the driving shaft between an engaged position and an disengaged position; wherein in the engaged position the at least one hammer face aligns with the at least one anvil face for transmitting torque from the hammer, as it is rotated by the driving shaft, to the anvil, thereby rotating the driven shaft; and wherein in the disengaged position no torque is transmitted;
   a biasing component for urging the hammer toward the anvil with sufficient force to prevent movement to the disengaged position until torque on the driving shaft exceeds a threshold, thereby releasing the hammer for rotation by the driving shaft while also being moved axially back toward the engaged position with the anvil to deliver an impact that generates a torque impulse delivered to the driven shaft;
   wherein the helical mating assembly comprises helical grooves formed on the driving shaft and complementary splines formed on the hammer.

2. The apparatus of claim 1, wherein the biasing component urges the one of the anvil and hammer toward engagement with the other of the anvil and hammer.

3. The apparatus of claim 1, wherein the biasing component comprises a spring that circumscribes the driving shaft.

4. The apparatus of claim 1, wherein the at least one hammer face is formed by at least one tooth depending from the hammer, and wherein the at least one anvil face is formed on at least one tooth depending from the anvil.

5. Apparatus, comprising:
a drill string containing a top end, a drill bit, and a rotating link between the top end and the drill bit for transmitting torque from the top end to the drill bit;
wherein the rotating link comprises:
a driving shaft connecting the top end and the rotating link;
a driven shaft connecting the rotating link and the drill bit;
a first portion and second portion for transmitting torque when the first portion is in an engaged position and not transmitting torque when the first portion is in an disengaged position;
the first portion having at least one hammer face that extends axially and the second portion having at least one anvil face that extends axially, the first and second portions being movable axially relative to each other between the engaged position in which the at least one hammer face is aligned with the at least one anvil face for engagement to transmit torque between the first and second portions, and the disengaged position in which the at least one hammer face is not aligned for engagement with the at least one anvil face;
a biasing component for urging the first portion to engage the second portion, the biasing component comprising a spring that circumscribes the driving shaft; and
a helical mating assembly between the first portion and the driving shaft that permits the first portion to move between the engaged position and the disengaged positions in response to a predetermined torque applied to the apparatus, the helical matting assembly comprising helical grooves formed on the first portion and complementary splines formed on the driving shaft; and
wherein the biasing component urges the first and second portions into the engaged position and the at least one hammer face and at least one anvil face into alignment for engagement for transmitting an impulse of torque.

6. The apparatus of claim 5, wherein the at least one hammer face is formed by at least one tooth depending from the first portion, and wherein the at least one anvil face is formed on at least one tooth depending from the second portion.

7. A method for transmitting torque between drill string components to reduce the risk of delivering excessive torque, comprising
delivering torque to a drill bit through a rotating link placed in the drill string, the rotating link having a first portion for reaching the torque and a second portion for transmitting torque to the drill bit wherein the first and second portions are movable axially relative to each other between an engaged position in which at least one hammer face that extends axially is aligned with at least one anvil face that extends axially for engagement to transmit torque between the first and second portions, and a disengaged position in which the at least one hammer face is not aligned for engagement with the at least one anvil face; and
when the torque applied across the rotating link exceeds a threshold value, utilizing axial force to separate the first portion and the second portion into the disengaged position, thereby permitting the hammer and anvil faces to move momentarily out of alignment;
continuing to deliver the torque to the first portion to rotate it more rapidly relative to the second portion; and
moving the first and second portions back into engagement to deliver an impulse of torque from the rotation by at least one hammer face impacting the at least one anvil face;
wherein delivering the torque comprises rotating a driving shaft connected with the rotating link, and the drill bit is coupled to a driven shaft connected with the rotating link;
wherein the second portion is comprised of an anvil coupled to the driven shaft, and the anvil comprising at least one at least one anvil face;
wherein the first portion is comprised of a hammer coupled to the driving shaft with a helical mating assembly, to allow for rotation and axial translation of the hammer on the driving shaft between the engaged position and the disengaged position;
wherein the helical mating assembly is comprised of helical grooves formed on the driving shaft and complementary splines formed on the hammer;
wherein the hammer comprises at least one hammer face that, in the engaged position, aligns with the at least one anvil face for transmitting torque from the hammer, as it is rotated by the driving shaft, to the anvil, thereby rotating the driven shaft; and wherein in the disengaged position no torque is transmitted; and
wherein the rotating link further comprises a biasing component for urging the hammer toward the anvil with sufficient force to prevent movement to the disengaged position until torque on the driving shaft exceeds a threshold, thereby releasing the hammer for rotation by the driving shaft while also being moved axially back toward the engaged position with the anvil to deliver an impact that generates a torque impulse delivered to the driven shaft.

8. The method of claim 7, wherein the at least one hammer face is formed by at least one tooth depending from the hammer, and wherein the at least one anvil face is formed by at least one tooth depending from the anvil.

* * * * *